(12) United States Patent
Lynch et al.

(10) Patent No.: US 6,705,666 B2
(45) Date of Patent: Mar. 16, 2004

(54) CAP FOR A VEHICLE LOAD BOX

(75) Inventors: David Lynch, Dearborn, PA (US); Jerome Farrell, Canton, MI (US); Leslie Ann Hersh, Ann Arbor, MI (US); Stephen Lewis Bruford, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 09/682,447

(22) Filed: Sep. 4, 2001

(65) Prior Publication Data

US 2003/0042758 A1 Mar. 6, 2003

(51) Int. Cl.$^7$ .............................. B60P 3/345; B60P 7/02
(52) U.S. Cl. .................. 296/164; 296/100.07; 296/24.1
(58) Field of Search ............................... 296/164, 26.04, 296/100.02, 100.06, 102, 24.1, 37.6, 100.01, 100.07, 100.09, 163, 183, 148, 146.8, 146.1, 151, 36

(56) References Cited

U.S. PATENT DOCUMENTS

| 2,453,937 A | 11/1948 | Ray |
| 2,910,255 A | 10/1959 | Johnson |
| 3,926,469 A | 12/1975 | Ulics |
| 4,216,725 A | 8/1980 | Hallam |
| 4,247,145 A | 1/1981 | Groene |
| 4,627,655 A | 12/1986 | Collins |
| 4,799,726 A | 1/1989 | Scott |
| 4,861,096 A | 8/1989 | Hastings |
| 5,584,493 A | 12/1996 | Demski et al. |
| 5,590,925 A | 1/1997 | Banks, Sr. |
| 6,036,208 A | 3/2000 | Frerichs |

FOREIGN PATENT DOCUMENTS

JP       0119445       5/1989

*Primary Examiner*—Stephen T. Gordon
*Assistant Examiner*—Greg Blankenship
(74) *Attorney, Agent, or Firm*—Gigette M. Bejin

(57) ABSTRACT

A cap (10) is provided for the load box (16) of a vehicle, like a pickup truck (12), including a box-like structure sized and adapted to fit on the load box to form an enclosed area for the storage of personal items, camping equipment, tools, parts or the like. On the forwardmost corner of the cap there is included a door (40) in the form of three-sided box (53, 58, 60), i.e., a door that wraps both around the forward corner of the cap and into the roof. Hinges (50) are provided at the cutline with the roof so that the door opens upwardly. In the preferred embodiment, closable and latchable steps (28) are structurally integrated into the a side of a load box at its forwardmost end and the door of the cap is aligned with the steps forming a doorway for improved ingress and egress to the enclosed area under the cap.

20 Claims, 2 Drawing Sheets

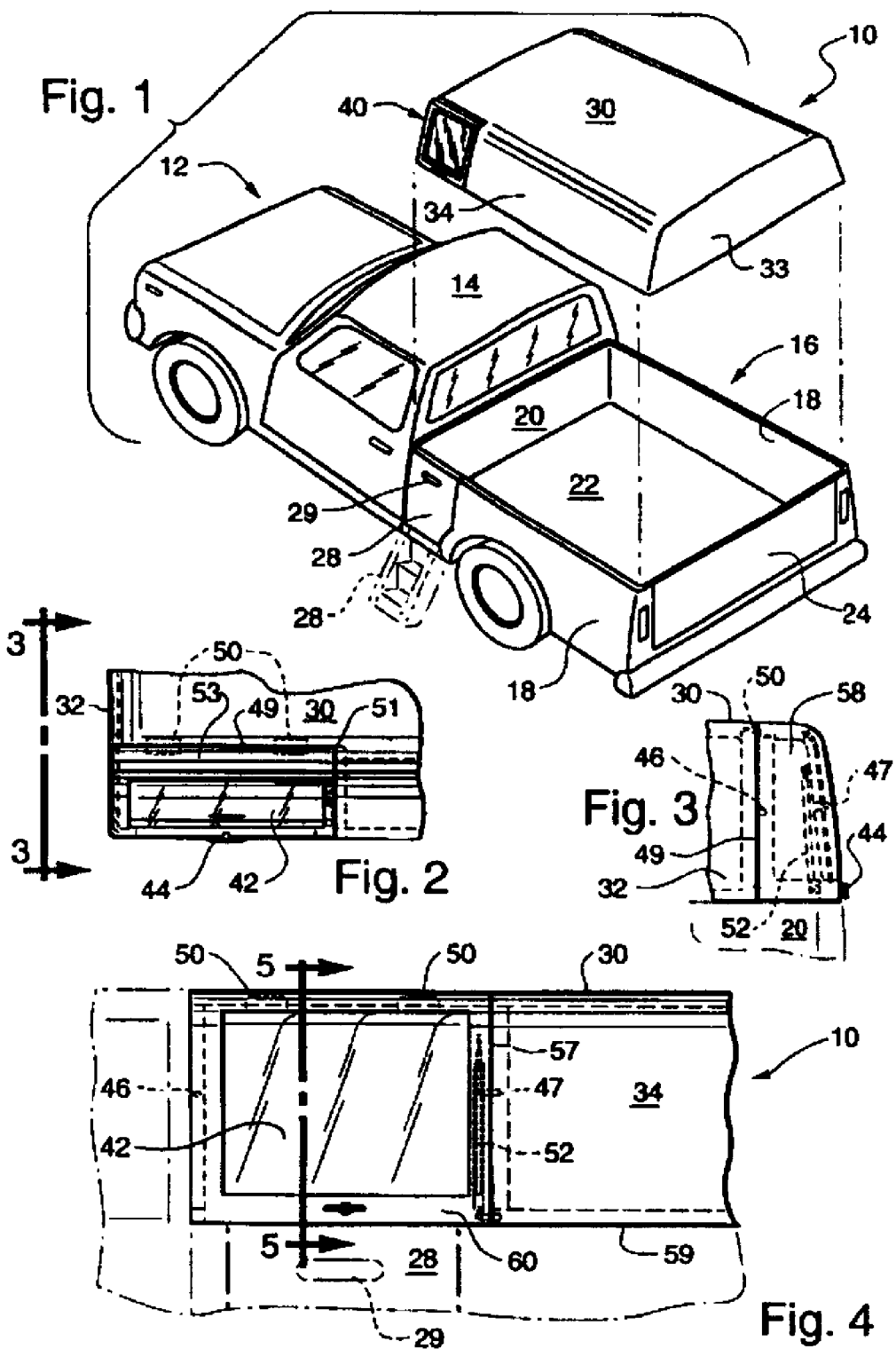

CAP FOR A VEHICLE LOAD BOX

CROSS REFERENCE TO RELATED APPLICATIONS

This application relates to U.S. patent application Ser. No. 09/686,703 entitled "Integrated Bed Side Step Assembly for Vehicles" in the names of Edward Pleet, Leslie Hersh and Gurminder Bedi, filed on Oct. 11, 2000.

BACKGROUND OF INVENTION

The present invention relates generally to caps for the load box of a vehicle and particularly to a cap for a pickup truck, and even more particularly relates to a cap for a pickup truck incorporating the step assembly of U.S. patent application Ser. No. 09/686,703.

U.S. patent application Ser. No. 09/686,703 discloses a novel structure for improved access to the load bed of a vehicle, and insofar as that pending application discloses and teaches the structure of steps through the sidewall of vehicle load bed, it is hereby fully incorporated herein by reference. More specifically, there is shown a set of closable steps built into the sidewall of a pickup truck load bed that provides greatly improved access to the load bed. In the open position the steps extended downwardly, placing the lower step adjacent the ground, making entry quite easy and, thus, improving access. In the closed position the steps are out of the way, filling the opening in the load bed sidewall. In it's preferred use and embodiment, the instant invention is an accessory for use with the modified load bed shown in U.S. patent application Ser. No. 09/686,703.

The primary problem addressed by the instant invention is to better meet the needs of the users of vehicle load bed caps, i.e., to better fulfill their business, personal or recreational requirements. In order to meet these requirements, the vehicle and the cap must function together in such a way as to provide adequate and satisfactory access to the enclosed area of the cap. In the past, either doors in the side of the cap, as shown in U.S. Pat. No. 5,590,925, or doors at the rear of the cap provided this access. Neither of these options is totally satisfactory in that they do not provide convenient and ready access to the entire area covered by the cap.

Another problem addressed by the instant invention is that of durability and strength of doors in caps. Work vehicles of the type having a load bed, such as pickup trucks, and any accessories thereto, such as the cap of the instant invention, are normally and very often subject to great stress and load forces while in operation or use. The door structure of the present invention not only offers the improved access discussed above, but is also much stronger and durable than access doors taught in the prior art.

It would be desirable and beneficial to provide a door for a vehicle load bed cap that would overcome the above-noted disadvantages of known load bed caps.

SUMMARY OF INVENTION

Accordingly, one object of the present invention is to provide a cap for a vehicle load bed, operating in conjunction with closable steps through the sidewall of the load bed, that contains an improved door allowing superior access to the area covered by the cap.

A further object of the present invention is to provide a cap for a vehicle load bed, operating in conjunction with closable steps through the sidewall of the load bed, that allows an individual to enter the cap enclosure more easily and comfortably because of the maximization of head and shoulder room.

A still further object of the present invention is to provide a structurally improved door for the cap of a vehicle load bed.

Yet another object of the present invention is to provide a cap for a vehicle load bed that includes a door comprised of a portion of the a side panel of said cap and smaller segments of the roof and front panel.

It is yet a further object of the present invention to provide a cap for a load bed, the cap including an improved door that may work in conjunction with foldable steps through the sidewall of the load bed in such a way as to provide easy, complete access to the area covered by the cap.

These and other objects, features and advantages are accomplished according to the instant invention by providing a cap for the load box of a vehicle, like a pickup truck, including a box-like structure sized and adapted to fit on the load box to form an enclosed area for the storage of personal items, camping equipment, tools, parts or the like. On the forwardmost corner of the cap there is included a door in the form of three-sided box, i.e., a door that wraps both around the forward corner of the cap and into the roof. Hinges are provided at the cutline with the roof so that the door opens upwardly. In the preferred embodiment, closable and latchable steps are structurally integrated into the side of a load box at its forwardmost end and the door of the cap is aligned with the steps forming a doorway for convenient ingress and egress to the enclosed area under the cap.

BRIEF DESCRIPTION OF DRAWINGS

The advantages of this invention will be apparent upon consideration of the following detailed disclosure of the invention, especially when taken in conjunction with the accompanying drawings wherein:

FIG. 1 is a perspective view, in exploded form, showing an exemplary vehicle, in this case a pickup truck, with closable steps through the sidewall of the load bed and a cap according to the instant invention;

FIG. 2 is a top plan view of the portion of the cap containing the door of the instant invention;

FIG. 3 is a front elevational view of the cap of FIG. 2 as seen from line 33 of FIG. 2;

FIG. 4 is an enlarged side elevational view of the portion of the cap shown in FIG. 2;

DETAILED DESCRIPTION

Figures 5, 6, 7:
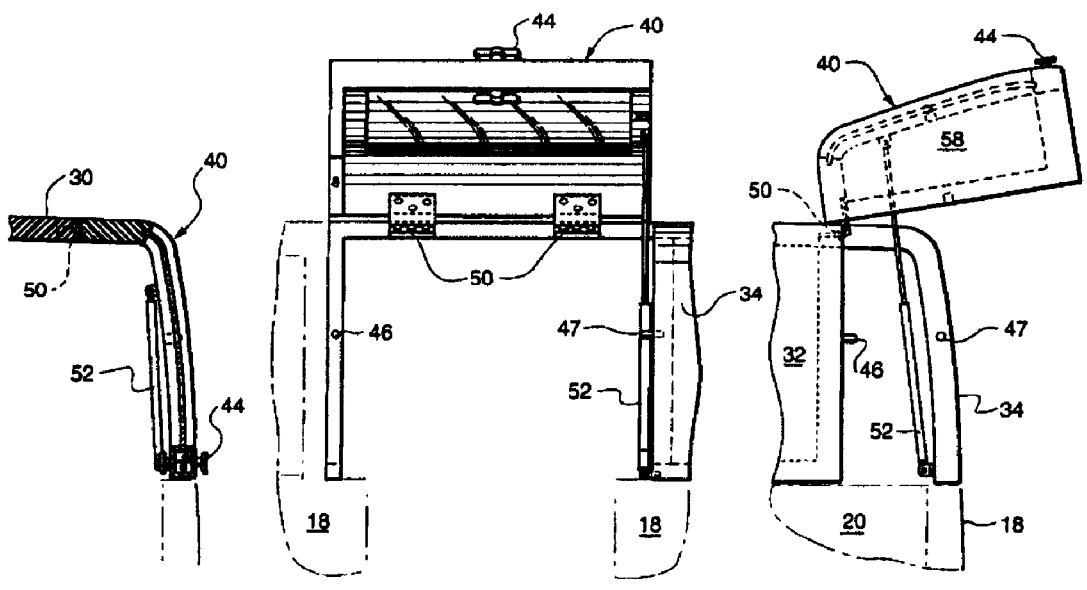
FIG. 5 is an enlarged sectional view taken along line 55 of FIG. 4.
FIG. 6 is a side elevational view of the cap of FIG. 4, but showing the door in the fully opened position.
FIG. 7 is a front elevational view of FIG. 6, similar to FIG. 3, but with the door in the fully opened position.

Referring now to the drawings and particularly FIG. 1, the cap of this invention is generally indicated by reference numeral 10 and is shown for clarity separated and above the pickup truck 12. Pickup truck 12 includes a cab 14 and a load box 16. The load box is comprised of longitudinal sidewalls 18, a front wall 20, a bed 22, and a rear wall 24. The rear wall 24 commonly consists of a tailgate. Importantly, the top edges of the sidewalls, front and rear walls are generally in a single horizontal plane with a flat surface on top. This is significant to the instant invention and all other load bed caps in that this geometry allows for a reasonable amount of standardization in the fitting of caps to load beds. Steps 28 in sidewall 18, as discussed above, are shown in the closed position (and open in phantom).

Cap 10 is in the general form of an open-bottomed box having a roof 30, a front panel 32, shown in FIG. 2, with an opposing rear panel 33, side panel 34 and an opposing side panel. A door 40 is provided in the front left corner of the cap, as will be discussed in further detail below. The cap may be constructed of a multitude of materials depending upon costs, convenience, desired durability, and styling. Construction and fabrication methods will vary depending upon an analysis of the usual variables known to one of ordinary skill in the fabrication and design arts. The intersections of the various panels may either be sharp or curved depending upon the manufacturing methods and materials employed, and the desired styling. The opposing panels making up the sides of the cap are generally parallel; however, in reality, as a result of fabrication and styling choices, they may be somewhat bulbous, curved or non-parallel. Additionally, the roof need not be planar, but rather may have a raised section or sections to vary the height of the covered area.

FIG. 4 shows a partial side elevational view of the door and steps as they would be arranged in the preferred embodiment. Door 40 is positioned in the front left corner of cap 10, thus allowing for the unique door structure to be detailed herein. Steps 28 are opened by activation of a handle 29, releasing the steps to pivot downwardly. In the open position the lower step is located conveniently adjacent to the ground. Door 40 is located above steps 28 so that they may together form an access opening into the area covered by cap 10. Door 40 may include a transparent window 42.

FIGS. 6 and 7 show the door 40 in its fully open position, and, though not completely shown, the steps 28 are in the open position also. Door 40 is opened by activation of a handle 44 that releases a latch mechanism engaged with pins 46 and 47, both affixed to the cap structure. Handle 44 is part of a mechanism that extends through the door, so that preferably there may also be a handle on the inside thereof to allow the door to be opened from either side. There are numerous handles and latch mechanisms known in the art that may be used in this structure with satisfactory results. The hinges 50 connect the top of the door with the roof 30 and allow the door to open upwardly. A gas cylinder or strut 52, of known construction and operation, is affixed to the cap structure and door 40 to assist in raising the door and holding it in the open position.

Referring now to FIGS. 2 through 7, door 40 is constructed generally in the form of a three-sided box, i.e., it is constructed of a main segment along panel 34 and smaller segments along roof 30 and front panel 32. Door 40 is formed in the front left corner where front panel 32, side panel 34 and roof 30 intersect; however, the door could likewise be located in any of the four corners, though the forward corners are the better options because they allow access to the most inaccessible portions of the load bed.

Referring to FIG. 2, and starting from point 51, a segment 53 of the roof 30 is formed by cutline 49 which extends forwardly and generally parallel to the side panel 34 around the intersection of roof 30 and front panel 32, thence downwardly, as seen in FIGS. 3 and 7, to the bottom edge 54 of front panel 32, forming segment 58 of panel 32. Main door segment 60, see FIG. 4, is formed by a cutline 57 (also starting at point 51) that extends transversely around the intersection of roof 30 and side panel 34, thence downwardly to the bottom edge 59 of side panel 34. Main door panel 60, segment 50 and segment 58 form the three-sided box. This structure is quite rigid, strong, and durable.

It should be noted from FIGS. 4 and 6 that the door 40 is somewhat larger in width than the opening required for steps 28. Much of this extra width is contributed by the unique structure of the door 40. In the open position front panel segment 58 is up out of the way, adding the width of the corner to the opening. The height of the opening is increased also, due to the fact that hinges 50 are in the roof spaced away from front panel 34 rather than in panel 34 itself.

As one of skill in the art will readily recognize, rubber or synthetic sealing materials or strips may be placed along the edges of the openings to provide a seal against the inflow of moisture and dust. Any number of additional features may be added to the cap structure, such as windows, access doors of other design, vents, skylights, and the like. Also, one skilled in the art will recognize that the transverse depth of segments 50 and 58 may vary as desired, but generally a few inches is adequate.

What is claimed is:

1. A cap for a vehicle load box positioned behind a cab enclosure, said load box having a front end, an opposing rear end, opposing sides generally perpendicular to said front and rear ends, and a bed, said cap comprising:

an open, inverted box-like structure sized and adapted to fit on said load box such that there is formed therewith a generally fully enclosed undivided single volume of space bounded by the vehicle load box and said structure;

said structure having a front end generally co-extensive with said load box front end adjacent the cab of the vehicle, a rear end opposing said front end, and sides generally perpendicular to said front and rear ends;

said structure further having a roof generally parallel to the bed of the vehicle load box and generally perpendicular to said ends and sides and connecting said ends and sides of said structure to form intersections therewith and a substantially unitary construction; and a latchable door in said structure, said door including a segment of one of the sides of said structure defining a main panel of said door and relatively smaller segments of said front end and roof whereby said door has the configuration of a three-sided box.

2. The cap of claim 1, wherein:

said door is located on a forward portion of said structure, to be adjacent the cab.

3. The cap of claim 2, wherein:

said segment of said roof included in said door is defined by a cutline in said roof, said cutline extending forwardly from a point on said roof to the front end, defining the width of said door, and transitioning around the intersection between the roof and the front end and extending downwardly along said front end to define the segment of said front end included in said door, said cutline also extending from said point on said roof transversely toward said one side and transitioning around the intersection between the roof and the said one side and then downwardly to the juncture where said one side meets the side of the vehicle load box.

4. The cap of claim 3, wherein:

said door is connected to said roof by a hinge, allowing said door to open upwardly.

5. The cap of claim 4, wherein:

said door includes a handle and latches for holding said door in a closed position; and a prop mechanism affixed to said door to assist in raising and holding said door in an open position.

6. The cap of claim 5, wherein:

the vehicle load box includes closable and latchable steps, in alignment with said door, leading through one side of the load box corresponding to said one side of said cap to allow access from the ground to the bed if the load box.

7. The cap of claim 6, wherein:

the width of said main panel of said door is greater than the width of the steps.

8. The cap of claim 7, wherein:

said main panel of said door includes a transparent window.

9. The cap of claim 8, wherein:

said door is sealed in a watertight manner when in a closed position, and the cap is sealable with the vehicle load box.

10. In a vehicle having a load box positioned behind a cab enclosure, said load box having closable and latchable steps leading through one side of the load box to allow access from the ground to the bed of the load box, the improvement comprising:

a cap including a front corner formed by an intersection between a roof, a front panel and a side panel adjacent said cab enclosure, said cap configured as an open, inverted box-like structure sized and adapted to fit on said load box such that there is created therewith a generally fully enclosed undivided single volume of space bounded by the vehicle load box and said structure, said cap further being affixed to the load box and having a door therein aligned with the steps;

said door is formed in a three-sided box configuration including a main panel of the door corresponding to a portion of said side panel and two smaller panels corresponding to a segment of the roof and a segment of the front panel.

11. The improvement of claim 10, wherein:

said door is connected to said roof by a hinge, allowing said door to open upwardly.

12. The improvement of claim 11, wherein:

said door includes a handle and cooperative latches for holding said door in a closed position; and a mechanism affixed to said door for raising and holding said door in an open position.

13. The improvement of claim 12, wherein:

the width of said main panel of said door is greater than the width of the steps.

14. The improvement of claim 13, wherein:

said main panel includes a transparent window.

15. The improvement of claim 14, wherein:

said door is sealed in a watertight manner when in a closed position, and said cap is sealed with said vehicle load box.

16. In a door for a truck cap adapted for mounting on a pickup truck load box to form an enclosure therewith, said truck cap having a roof, generally opposing front and rear ends and laterally opposed sides, the improvement comprising:

said door being formed in the configuration of a three-sided box including a segment of one of said sides, a segment of said roof contiguous with said one side, and a segment of said front end contiguous to both said roof and said one side.

17. The door of claim 16, wherein:

said door is mounted to said roof by a hinge permitting said door to open upwardly into an open position.

18. The door of claim 17, wherein:

said load box includes closable and latchable steps leading through a side of the load box corresponding to said one side of said cap to allow access from the ground into said enclosure, said door having a longitudinal width greater than a corresponding longitudinal width of said steps.

19. The door of claim 18, further comprising:

a device for use in moving said door from a closed position to said open position and in retaining said door in the open position.

20. The door of claim 19, further comprising:

a seal associated with a perimeter of said three-sided box configuration to make a watertight closure of said door when in said closed position.

* * * * *